United States Patent
Hakamada

(10) Patent No.: US 9,779,333 B2
(45) Date of Patent: Oct. 3, 2017

(54) PRINTING SYSTEM WITH MULTIPLE PRINTERS

(71) Applicant: RISO KAGAKU CORPORATION, Tokyo (JP)

(72) Inventor: Junichi Hakamada, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 15/165,287

(22) Filed: May 26, 2016

(65) Prior Publication Data

US 2016/0379096 A1    Dec. 29, 2016

(30) Foreign Application Priority Data

Jun. 25, 2015   (JP) ................................ 2015-127250

(51) Int. Cl.
| | |
|---|---|
| G06K 15/10 | (2006.01) |
| B41J 2/165 | (2006.01) |
| B41J 2/505 | (2006.01) |
| B41J 2/515 | (2006.01) |
| B41J 3/60 | (2006.01) |
| G06K 15/16 | (2006.01) |

(52) U.S. Cl.
CPC ............ *G06K 15/102* (2013.01); *B41J 2/165* (2013.01); *B41J 2/16585* (2013.01); *B41J 2/505* (2013.01); *B41J 2/515* (2013.01); *B41J 3/60* (2013.01); *G06K 15/16* (2013.01); *B41J 2002/16573* (2013.01); *B41J 2002/16591* (2013.01); *G06K 2215/0094* (2013.01); *G06K 2215/101* (2013.01)

(58) Field of Classification Search
CPC .................................................. G06K 15/102
USPC .......................................................... 358/1.4
See application file for complete search history.

(56) References Cited

U.S. PATENT DOCUMENTS

| | | |
|---|---|---|
| 5,587,730 A | 12/1996 | Karz |
| 2004/0042039 A1* | 3/2004 | Kodera ................. G06K 15/00 358/1.15 |

(Continued)

FOREIGN PATENT DOCUMENTS

| | | |
|---|---|---|
| EP | 1 382 457 | 1/2004 |
| JP | 2010-99955 | 5/2010 |

(Continued)

OTHER PUBLICATIONS

Extended European Search Report for EP 16172407.5 having a mailing date of Oct. 17, 2016.

*Primary Examiner* — Jacky X Zheng
(74) *Attorney, Agent, or Firm* — Greenblum & Bernstein, P.L.C.

(57) ABSTRACT

The controller: upon receiving a print job, determine whether only one of a first printer and a second printer is under cleaning; upon determining that the only one of the first printer and the second printer is under cleaning, analyze whether a print processing based on the print job is a first print processing in which printing is executable by any of the first printer and the second printer or a second print processing in which printing is to be executed by both the first printer and the second printer; and upon analyzing that the print processing based on the print job is the first print processing, drive the other one of the first printer and the second printer which is not under cleaning to execute the first print processing.

7 Claims, 5 Drawing Sheets

(56) References Cited

U.S. PATENT DOCUMENTS

| | | | |
|---|---|---|---|
| 2011/0050778 A1* | 3/2011 | Kaiho | B41J 2/16585 347/16 |
| 2011/0181658 A1 | 7/2011 | Izawa et al. | |
| 2012/0154864 A1 | 6/2012 | Arai | |
| 2013/0293608 A1* | 11/2013 | Ohtsu | B41J 2/16585 347/9 |

FOREIGN PATENT DOCUMENTS

| | | |
|---|---|---|
| WO | 2008/065657 | 6/2008 |
| WO | 2014/124836 | 8/2014 |

* cited by examiner

FIG. 3

| IDENTIFICATION INFORMATION | CLEANING MANAGEMENT PRINTED SHEET NUMBER |
|---|---|
| 1 | 800 |
| 2 | 500 |

PRINTING SYSTEM WITH MULTIPLE PRINTERS

CROSS REFERENCE TO RELATED APPLICATION

This application is based upon and claims the benefit of priority from the prior Japanese Patent Application No. 2015-127250, filed on Jun. 25, 2015, the entire contents of which are incorporated herein by reference.

BACKGROUND

1. Technical Field

The disclosure relates to a printing system in which multiple printers including printing units are arranged in series along a conveyance route of a sheet.

2. Related Art

There is a printing system in which multiple printing units having ink heads are arranged in a conveyance route of a sheet and collaborate with each other to execute print processing based on a print job.

Japanese Unexamined Patent Application Publication No. 2010-99955 proposes a technique in which two printing units are arranged in a conveyance route of a sheet and print images on both sides of the sheet by printing the image on the front side of the sheet with one printing unit and printing the image on the back side of the sheet with the other printing unit.

In addition to the aforementioned technique, there is a technique of printing images based on a print job by using a tandem configuration in which multiple printers including printing units are arranged in series along a conveyance route of a sheet.

With the printers collaborating with each other, a printing system (hereafter, referred to as tandem printing system as appropriate) to which techniques like ones described above are applied can execute complex print processing such as both-side printing processing more efficiently at a faster speed and achieves higher productivity than a system including one printer

SUMMARY

The related tandem printing system is configured such that each of the printing units included in the multiple printers is cleaned at a predetermined timing to maintain a normal ejection state of the ink head. All the printers are stopped from printing during execution of the cleaning processing in the printing unit of any of the multiple printers.

In other words, in the related tandem printing system, the print processing is stopped also in the printer in which no cleaning processing is executed. Accordingly, the time during the cleaning processing cannot be effectively utilized, and this leads to decrease in productivity.

An object of the disclosure is to provide a printing system which can improve productivity by printing an image while effectively utilizing time during cleaning processing.

A printing system in accordance with some embodiments includes: a conveyance route configured to convey a sheet; a first printer configured to execute printing on the sheet; a second printer configured to execute printing on the sheet; a first cleaner configured to execute cleaning in the first printer upon satisfaction of a first cleaning execution condition; a second cleaner configured to execute cleaning in the second printer upon satisfaction of a second cleaning execution condition; and a controller configured to control the first printer and the second printer. The first printer and the second printer are arranged in series along the conveyance route. The controller is configured to: receive a print job; upon receiving the print job, determine whether only one of the first printer and the second printer is under cleaning; upon determining that the only one of the first printer and the second printer is under cleaning, analyze whether a print processing based on the print job is a first print processing in which printing is executable by any of the first printer and the second printer or a second print processing in which printing is to be executed by both the first printer and the second printer; and upon analyzing that the print processing based on the print job is the first print processing, drive the other one of the first printer and the second printer which is not under cleaning to execute the first print processing.

According to the configuration described above, when the cleaning processing is determined to be performed in only one of the two printers, the controller analyzes whether the print processing based on the print job is the first print processing in which the printing is executable by any of the printers or the second print processing in which the printing is to be executed by the two printers. Moreover, when the print processing based on the print job is analyzed to be the first print processing, the controller executes the first print processing by using the printer in which no cleaning processing is performed.

As described above, even while the cleaning processing is being performed in only one of the printers, but if the print processing based on the print job is the first print processing, the first print processing can be executed by the printer in which no cleaning processing is performed. Thus, instead of stopping the print processing, the printing system can execute the first print processing with the printer in which no cleaning processing is performed, when the cleaning processing is being performed in one of the printers. Accordingly, it is possible to effectively utilize the time during the cleaning processing and improve productivity of the tandem printing system.

The first print processing may be a single-side printing processing in which printing is executed on one side of the sheet. The second print processing may be a both-side printing processing in which printing is executed on both sides of the sheet.

According to the configuration described above, the productivity of the tandem printing system can be improved by effectively utilizing the time during the cleaning processing.

The first printer may be configured to execute a print processing by using a first printing unit capable of printing with a K color printing agent. The second printer may be configured to execute a print processing by using a second printing unit capable of printing with a C color printing agent, an M color printing agent, and a Y color printing agent. The first print processing may be a black-and-white print processing in which black-and-white printing is executable. The second print processing may be a color print processing in which color printing is to be executed.

According to the configuration described above, the productivity of the tandem printing system can be improved by effectively utilizing the time during the cleaning processing.

The controller may be configured to: count a first printed sheet number and a second printed sheet number, the first printed sheet number being a number of sheets printed in the first printer from completion of the cleaning to start of the next cleaning in the first printer, the second printed sheet number being a number of sheets printed in the second printer from completion of the cleaning to start of the next cleaning in the second printer; upon none of the first printer and the second printer being under cleaning, analyze whether the print processing based on the print job is the first print processing or the second print processing; and upon analyzing that the print processing based on the print job is the first print processing, select one of the first printer and the second printer and drive the selected printer to execute the first print processing such that the first printed sheet number and the second printed sheet number become equal or close to each other.

The configuration described above is a configuration for increasing time in which the second print processing can be executed. Specifically, in the aforementioned printing system, when the cleaning processing is being performed in one of the printers, the first print processing can be executed but the second print processing cannot be executed. Accordingly, for example, when the cleaning processing is executed at different timings in the respective printers, a period in which the second print processing cannot be executed becomes longer.

In view of this, in the configuration described above, in a normal state in which no cleaning processing is performed in the printers, the controller analyzes whether the print processing based on the print job is the first print processing or the second print processing. Then, when the print processing is analyzed to be the first print processing, the controller executes the first print processing by using one of the printers such that the printed sheet numbers of the printers becomes equal to each other.

According to the configuration described above, since the controller executes the first print processing such that the printed sheet numbers of the printers become equal to each other, it is possible to prevent the cleaning processing from being executed at different timings in the respective printers. In other words, the cleaning processing is more likely to be executed at the same timing in the printers. Accordingly, it is possible to increase the period in which the second print processing can be executed.

BRIEF DESCRIPTION OF DRAWINGS

FIG. 3 is a diagram depicting an example of a table stored in a storage of the tandem printing system in the first embodiment.

DETAILED DESCRIPTION

Figure 1:
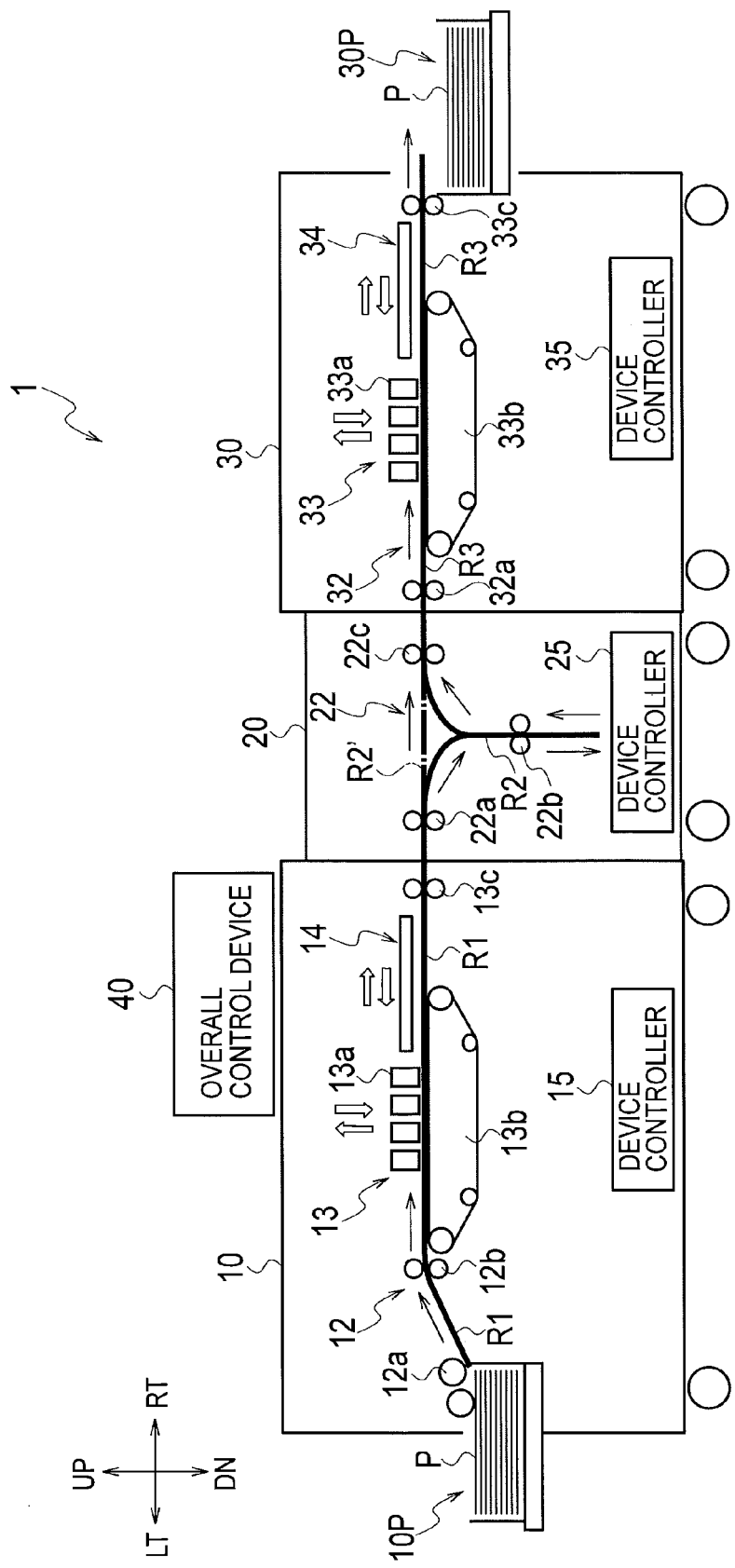
FIG. 1 is a schematic configuration diagram of a tandem printing system in a first embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

First Embodiment

A first embodiment of the present invention is described below with reference to the drawings.

Schematic Configuration of Tandem Printing System

First, a configuration of a tandem printing system 1 in the first embodiment is described. The tandem printing system 1 receives a print job transmitted from a terminal device such as a PC and prints an image on a sheet which is a print medium, based on the received print job.

Moreover, the tandem printing system 1 in the embodiment is a printing system having a configuration in which two printers each configured to perform predetermined print processing on the sheet are arranged in series (in tandem) along a conveyance route of the sheet.

FIG. 1 is a schematic configuration diagram of the tandem printing system 1 in the first embodiment. As illustrated in FIG. 1, the tandem printing system 1 in the first embodiment includes a first printer 10, an intermediate device 20, a second printer 30, and an overall control device 40. Note that, in FIG. 1, directions of right, left, up, and down are denoted by RT, LT, UP, and DN, respectively.

In the embodiment, the first printer 10 and the second printer 30 correspond to the two printers described above, and are simply referred to as printer as appropriate in the following description.

Moreover, in the embodiment, the predetermined print processing is processing of completing requested printing of an image on one side of the sheet, and the first printer 10 executes the predetermined print processing on one side of the sheet while the second printer 30 executes the print processing on the other side of the sheet.

For example, when single-side printing processing is executed as print processing based on the print job, the first printer 10 or the second printer 30 executes the single-side printing processing. Meanwhile, when both-side printing processing is executed, the first printer 10 executes the print processing on a front side of the sheet while the second printer executes the print processing on a back side of the sheet to execute the both-side printing processing. Note that the predetermined print processing includes black-and-white print processing or color printing processing.

Moreover, a route illustrated by bold lines in FIG. 1 is the conveyance route through which the sheet is conveyed. The conveyance route includes a conveyance route R1 in the first printer 10, a conveyance route R2 in the intermediate device 20, and a conveyance route R3 in the second printer 30. The conveyance route R2 in the intermediate device 20 is a turn-over route for turning over the sheet. When the turn-over of the sheet is unnecessary, the route of the sheet is switched to a straight conveyance route R2' through which the sheet is conveyed without being turned over.

As illustrated in FIG. 1, the first printer 10 includes a conveyer 12, a printing unit 13, a cleaner 14, and a device controller 15.

The conveyer 12 includes an external paper feed roller 12a and registration rollers 12b. The external paper feed roller 12a conveys each of sheets P stacked on a paper feed tray 10P toward the registration rollers 12b. The registration rollers 12*b* temporarily stop the sheet P conveyed from the external paper feed roller 12*a* and then send the sheet to the printing unit 13.

The printing unit 13 prints an image on the sheet P while conveying the sheet P. The printing unit 13 includes an ink head unit 13*a*, a belt conveyer 13*b*, and paper discharge rollers 13*c*.

The ink head unit 13*a* is arranged above the belt conveyer 13*b* and has multiple line-type inkjet heads in each of which multiple nozzles are arranged in a direction substantially orthogonal to the conveyance direction of the sheet P. The ink head unit 13*a* prints an image on the sheet P conveyed by the belt conveyer 13*b* by ejecting inks from the inkjet heads. In the embodiment, the ink head unit 13*a* includes inkjet heads capable of ejecting a K color ink (black color ink), a C color ink (cyan color ink), an M color ink (magenta color ink), and a Y color ink (yellow color ink), respectively.

The belt conveyer 13*b* conveys the sheet P conveyed from the registration rollers 12*b* while sucking and holding the sheet P on a belt. The belt conveyer 13*b* is arranged downstream of the registration rollers 12*b* and below the ink head unit 13*a*.

The paper discharge rollers 13*c* discharge (deliver) the sheet P subjected to printing by the ink head unit 13*a* to the intermediate device 20.

The cleaner 14 executes cleaning processing of cleaning an ink ejection surface of the ink head unit 13*a*, when a cleaning execution condition is satisfied in the first printer 10. In the embodiment, a situation where the cleaning execution condition is satisfied means that the number of sheets printed after the previous cleaning processing reaches a predetermined sheet number specified in advance. Moreover, the cleaning processing is executed also in the second printer 30 in a similar way.

However, the situation where the cleaning execution condition is satisfied is not limited to this. For example, the situation may be a situation where an added-up value (integrated value) of the amount of ink ejected after the previous cleaning processing reaches a predetermined ejection amount specified in advance. In the embodiment, the number of sheets printed after the previous cleaning processing corresponds to a cleaning management printed sheet number in the following description.

In the print processing, the cleaner 14 is arranged at a home position (housed position) illustrated in FIG. 1. In the cleaning processing, the ink head unit 13*a* moves to a retreat position on the upper side, and then the cleaner 14 moves below the ink head unit 13*a* to move to a cleaning position.

The cleaning position at which the cleaner 14 is arranged by the aforementioned movement is located between the ink head unit 13*a* and the belt conveyer 13*b*. Moreover, the cleaning position is such a position that the sheet P can be conveyed along the conveyance route R1 below the cleaner 14. A configuration in which the ink head unit 13*a* is lifted and the cleaner 14 is arranged below the ink head unit 13*a* as described above can be given as a specific example.

In the first printer 10, the sheet P can be thereby conveyed along the conveyance route R1 regardless of whether the cleaner 14 is arranged at the home position or the cleaning position.

The first printer 10 includes a moving motor (not illustrated) configured to move the cleaner 14 from the home position (housed position) to the cleaning position, a moving motor (not illustrate) configured to lift and lower the ink head unit 13*a* in an up-down direction, and the like. The configurations thereof are, for example, those in publicly-known techniques and detailed description thereof is omitted herein.

The device controller 15 controls various functions in the first printer 10. The device controller 15 controls the conveyer 12 and the printing unit 13 to print an image on the sheet P. Moreover, when the cleaning execution condition is satisfied, the device controller 15 controls the printing unit 13 and the cleaner 14 to execute the cleaning processing on the ink head unit 13*a*.

The intermediate device 20 is arranged downstream of the first printer 10 in the conveyance direction. The intermediate device 20 conveys the sheet P conveyed from the first printer to the second printer 30. The intermediate device 20 includes a conveyer 22 and a device controller 25.

The conveyer 22 includes conveyance rollers 22*a*, 22*b*, and 22*c*, and conveys the sheet P along the conveyance route R2 or the straight conveyance route R2' by using the conveyance rollers 22*a*, 22*b*, and 22*c*.

The device controller 25 controls various functions of the intermediate device 20. The device controller 25 controls the conveyer 22 to convey the sheet P while performing switching to the conveyance route R2 or the straight conveyance route R2'.

The second printer 30 is arranged downstream of the intermediate device 20 in the conveyance direction. A configuration of the second printer 30 is substantially the same as the configuration of the first printer 10. The second printer 30 includes a conveyer 32, a printing unit 33, a cleaner 34, and a device controller 35.

The conveyer 32 includes conveyance rollers 32*a* and conveys the sheet P conveyed from the intermediate device 20 to the printing unit 33.

The printing unit 33 prints an image on the sheet P while conveying the sheet P. The printing unit 33 includes an ink head unit 33*a*, a belt conveyer 33*b*, and paper discharge rollers 33*c*.

Since configurations of the ink head unit 33*a* and the belt conveyer 33*b* are the same as the configurations of the ink head unit 13*a* and the belt conveyer 13*b* of the first printer 10 described above, detailed description thereof is omitted.

The paper discharge rollers 33*c* discharge the sheet P subjected to printing by the ink head unit 33*a* to a paper discharge unit 30P.

The cleaner 34 executes cleaning processing of cleaning an ink ejection surface of the ink head unit 33*a* when the cleaning execution condition is satisfied in the second printer 30. Since a configuration of the cleaner 34 is the same as the configuration of the cleaner 14 of the first printer 10 described above, detailed description thereof is omitted.

Moreover, like the first printer 10, the second printer is configured such that the sheet P can be conveyed along the conveyance router R3 regardless of whether the cleaner 34 is arranged at a home position or a cleaning position.

The device controller 35 controls various functions in the second printer 30. The device controller 35 controls the conveyer 32 and the printing unit 33 to print an image on the sheet P. Moreover, when the cleaning execution condition is satisfied, the device controller 35 controls the printing unit 33 and the cleaner 34 to execute the cleaning processing on the ink head unit 33*a*.

The overall control device 40 controls various functions in the tandem printing system 1. Moreover, the overall control device 40 controls the first printer 10, the intermediate device 20, and the second printer 30 as a whole to execute the print processing based on the print job.

Configuration of Overall Control Device 40

Figure 2:
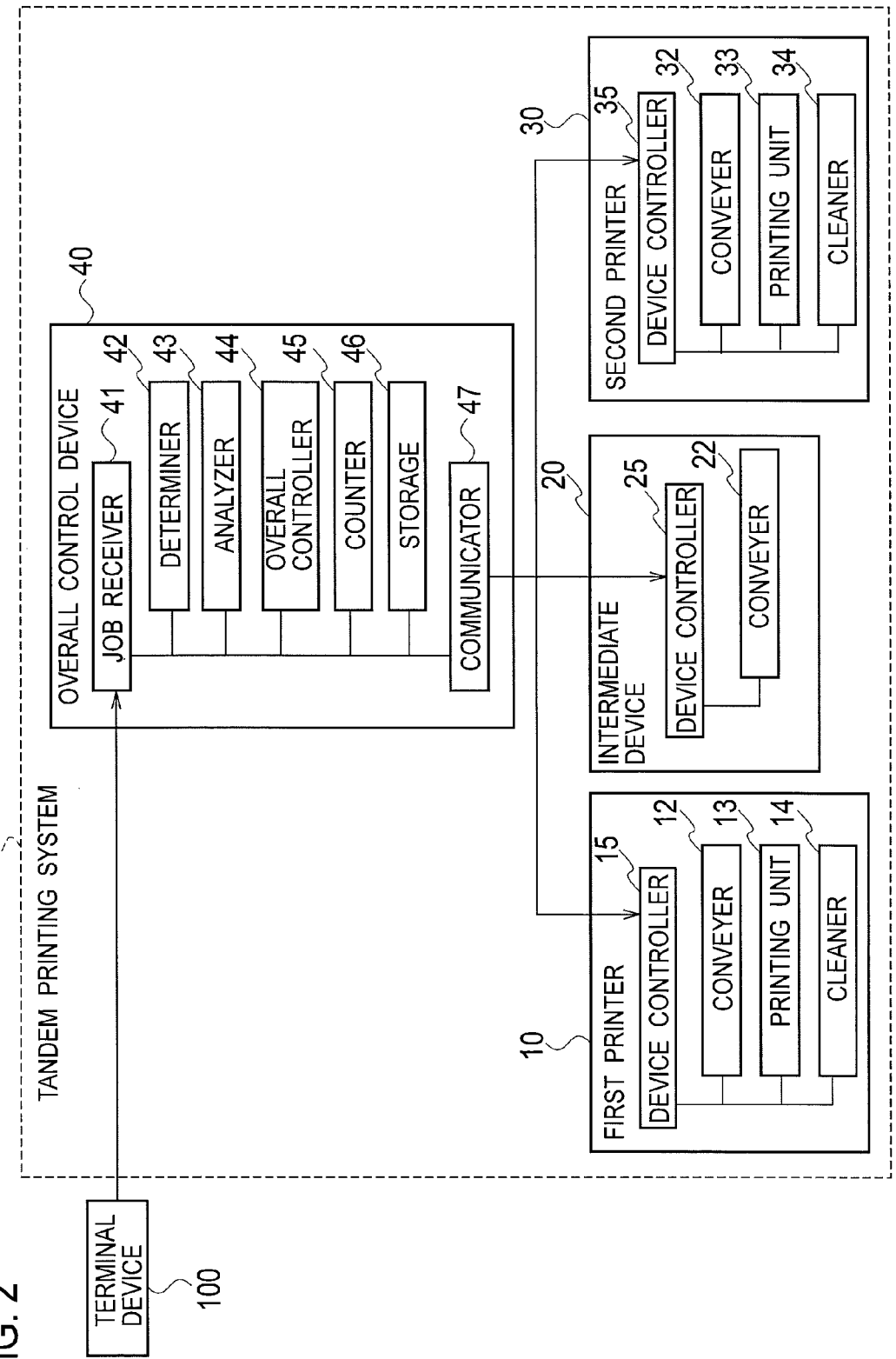
FIG. 2 is a block diagram depicting functions of the tandem printing system in the first embodiment.

Next, a configuration of the overall control device 40 is specifically described. FIG. 2 is a block diagram depicting functions of the tandem printing system 1.

As illustrated in FIG. 2, the overall control device 40 includes a job receiver 41, a determiner 42, an analyzer 43, an overall controller 44, a counter 45, a storage 46, and a communicator 47.

The job receiver 41 exchanges information with the terminal device 100. Specifically, the job receiver 41 receives the print job from the terminal device 100 used by a user. Communication herein includes, for example, an intranet (corporate network), a home network, and the like, and may be wired communication or wireless communication.

The determiner 42 determines whether the cleaning processing is being performed in only one out of the two printers upon receipt of the print job. Specifically, the determiner 42 first determines whether a group of the first printer 10 and the second printer 30 includes a printer in which the cleaning processing is being performed. Then, when the group of the first printer 10 and the second printer 30 includes a printer in which the cleaning processing is being performed, the determiner 42 determines whether the cleaning processing is being performed in only one of the first printer 10 and the second printer 30.

The analyzer 43 analyzes the printing processing based on the received print job. Specifically, when the cleaning processing is determined to be performed in only one of the printers, the analyzer 43 analyzes whether the print processing based on the print job is first print processing in which printing can be performed by any of the printers or second print processing in which printing is performed by two printers.

In the embodiment, the first print processing is the single-side printing processing in which printing is performed on one side of the sheet by any of the printers. Meanwhile, the second print processing is the both-side printing processing in which printing is performed on both sides of the sheet by the two printers.

The overall controller 44 controls various functions in the overall control device 40. For example, the overall controller 44 performs processing relating to image data, operation control of various units, and various processing in response to user operations. Moreover, in the embodiment, when the print processing based on the print job is analyzed to be the single-side printing processing (first print processing) during the cleaning processing, the overall controller 44 executes the single-side printing processing by using a printer in which no cleaning processing is performed.

The counter 45 counts the number of printed sheets for each of the first printer 10 and the second printer 30. Specifically, the counter 45 counts, as the number of printed sheets, the cleaning management printed sheet number from the previous cleaning processing to a point where the number reaches the predetermined sheet number and the cleaning processing is performed.

Moreover, the counter 45 stores the counted cleaning management printed sheet number in the storage 46. Specifically, as depicted in FIG. 3, the counter 45 stores the cleaning management printed sheet number of each of the first printer 10 and the second printer 30 in the storage 46 while associating the cleaning management printed sheet number with identification information for identifying the first printer and the second printer 30 from each other.

The cleaning management printed sheet number counted by the counter 45 is used to determine whether the cleaning execution condition is satisfied. Specifically, whether the cleaning execution condition is satisfied is determined by determining whether the cleaning management printed sheet number reaches the predetermined sheet number. In other words, the cleaning management printed sheet number is used as an index value of determining whether the cleaning execution condition is satisfied.

The storage 46 is formed of a hard disk drive, a memory, or the like and stores various pieces of information used in the processing of the overall control device 40.

The communicator 47 exchanges various pieces of information with the first printer 10, the intermediate device 20, and the second printer 30.

Operation of Tandem Printing System 1

Figure 4:
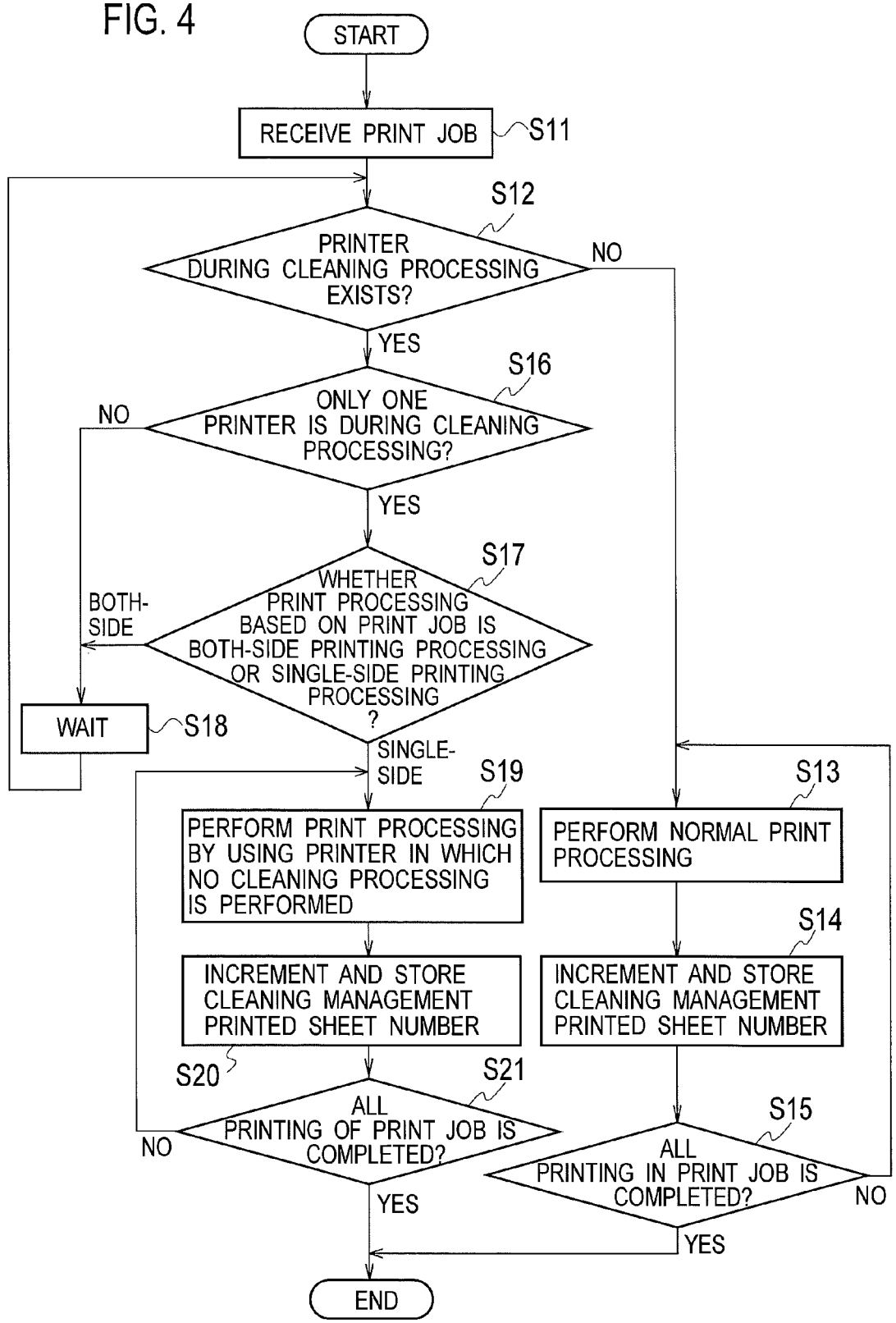
FIG. 4 is a flowchart depicting an operation of the tandem printing system in the first embodiment.

Next, an operation of the tandem printing system 1 is described. FIG. 4 is a flowchart depicting an operation in which the tandem printing system 1 obtains the print job.

In step S11, in the tandem printing system 1, the job receiver 41 receives the print job.

In step S12, the determiner 42 determines whether the group of the first printer 10 and the second printer 30 includes a printer in which the cleaning processing is being performed.

In step S13, when the determiner 42 determines that the group of the first printer 10 and the second printer 30 includes no printer in which the cleaning processing is being performed ("NO" in step S12), the overall controller 44 recognizes that the printers are in a normal state in which no cleaning processing is executed, and executes normal print processing. Specifically, the overall controller 44 executes the print processing based on the print job while controlling the first printer 10, the intermediate device 20, and the second printer 30.

In step S14, when one of the first printer 10 and the second printer 30 prints one sheet, the counter 45 increments the cleaning management printed sheet number of the printer performing the printing by one, and stores the cleaning management printed sheet number in the storage 46. Then, in step S15, the overall controller 44 determines whether printing of all sheets for the print job is completed. When the printing is not completed ("NO" in step S15), the overall controller 44 causes the operation to return to step S13. When the printing is completed ("YES" in step S15), the operation is completed.

Meanwhile, in step S16, when the determiner 42 determines that the group of the first printer 10 and the second printer includes a printer in which the cleaning processing is being performed ("YES" in step S12), the determiner 42 recognizes that a printer is in a cleaning processing state, and determines whether the cleaning processing is being performed in only one of the first printer 10 and the second printer 30.

In step S17, when the determiner 42 determines that the cleaning processing is being performed in only one of the first printer 10 and the second printer 30 ("YES" in step S16), the analyzer 43 determines whether the print processing based on the print job is the both-side printing processing or the single-side printing processing.

In step S18, when the determiner 42 determines that the cleaning processing is being performed in both of the first printer 10 and the second printer 30 ("NO" in step S16) and when the analyzer 43 determines that the print processing is the both-side printing processing ("BOTH-SIDE" in step S17), the overall controller 44 waits until the cleaning processing is completed. Specifically, in step S18, the overall controller 44 determines that the print processing based on the print job cannot be executed due to the cleaning processing, and suspends the print processing until the cleaning processing is completed.

In step S19, when the analyzer 43 determines that the print processing is the single-side printing processing ("SINGLE-SIDE" in step S17), the overall controller 44 executes the single-side printing processing based on the print job by using a printer in which no cleaning processing is performed. Specifically, the overall controller 44 determines that, although the cleaning processing is executed, the single-side printing processing can be executed, and executes the print processing.

Since processing from steps S20 to S21 is the same as the processing from steps S14 to S15 described above, description thereof is omitted.

As described above, in the tandem printing system 1, when the cleaning processing is being performed in only one of the two printers and the print processing based on the print job is the single-side printing processing, the single-side printing processing is executed even during the cleaning processing.

Figure 5:
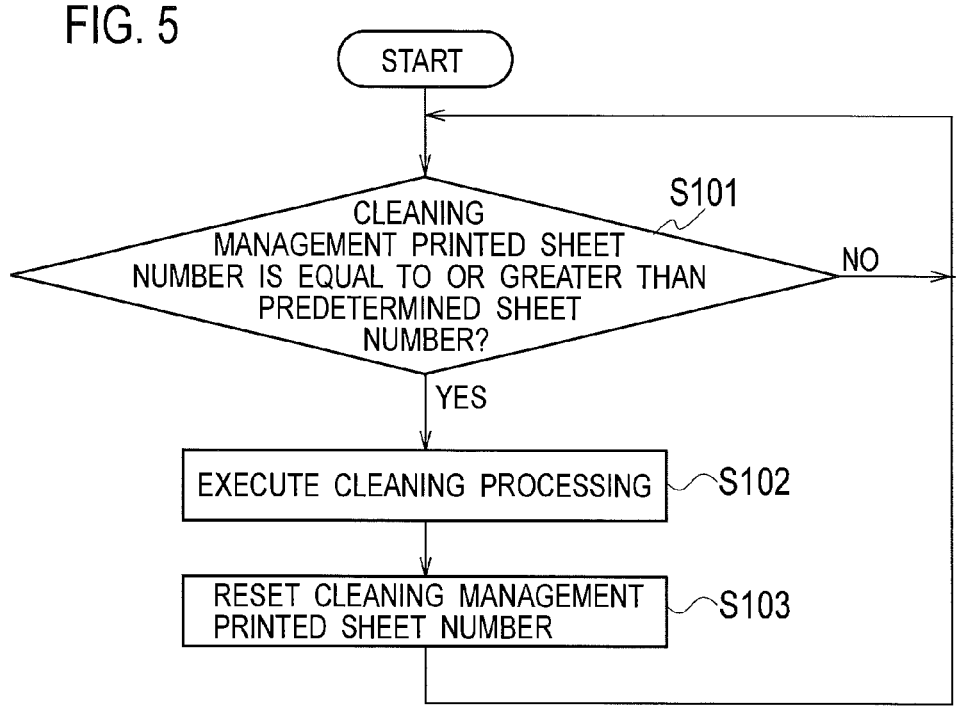
FIG. 5 is a flowchart depicting an operation of the tandem printing system in the first embodiment.

Next, an operation performed when the tandem printing system 1 executes the cleaning processing is briefly described. FIG. 5 is a flowchart depicting the operation performed when the tandem printing system 1 executes the cleaning processing. Note that, in the tandem printing system 1, the operation described below may be constantly performed during the print processing or performed when the counter 45 increments the cleaning management printed sheet number.

First, in step S101, the overall controller 44 determines whether the cleaning execution condition is satisfied. Specifically, the overall controller 44 determines whether the cleaning management printed sheet number is equal to or greater than the predetermined sheet number (for example, "1000") by referring to the storage 46. Note that, when the overall controller 44 determines that the cleaning management printed sheet number is not equal to or greater than the predetermined sheet number ("NO" in step S101), the overall controller 44 repeats the operation of step S101.

In step S102, when the overall controller 44 determines that the cleaning management printed sheet number is equal to or greater than the predetermined sheet number ("YES" in step S101), the overall controller 44 gives an instruction to execute the cleaning processing for a printer in which the cleaning management printed sheet number is equal to or greater than the predetermined sheet number. For example, when the cleaning management printed sheet number of the first printer 10 is equal to or greater than the predetermined sheet number, the overall controller 44 instructs the cleaner 14 of the first printer 10 to execute the cleaning processing.

In step S103, when the cleaning processing is completed, the overall controller 44 resets the cleaning management printed sheet number. Specifically, the overall controller 44 changes the cleaning management printed sheet number associated with the identification information (for example, "1") of the printer (for example, the first printer 10) having completed the cleaning processing to "0" in the storage 46.

Operations and Effects

As described above, in the tandem printing system 1 of the first embodiment, when the cleaning processing is determined to be performed in only one of the first printer 10 and the second printer 30, the analyzer 43 analyzes whether the print processing based on the print job is the single-side printing processing (first print processing) in which printing can be performed by any of the first printer 10 and the second printer 30 or the both-side printing processing (second print processing) in which printing is performed by both of the first printer 10 and the second printer 30. Moreover, when the print processing based on the print job is analyzed to be the single-side printing processing, the overall controller 44 executes the single-side printing processing by using a printer in which no cleaning processing is performed.

As described above, in the tandem printing system 1 of the first embodiment, even while the cleaning processing is being performed in one of the first printer 10 and the second printer 30, but if the print processing based on the print job is the single-side printing processing, the single-side printing processing can be executed by a printer in which no cleaning processing is performed. Thus, instead of stopping the print processing, the printing system executes the single-side printing processing when the cleaning processing is being performed in one of the printers. Accordingly, it is possible to effectively utilize the time during the cleaning processing and improve productivity of the tandem printing system 1.

MODIFIED EXAMPLE 1

Next, a modified example 1 of the tandem printing system 1 of the first embodiment is described.

Although the first print processing is described as the single-side printing processing and the second print processing is described as the both-side printing processing in the aforementioned first embodiment, the present invention is not limited to this. For example, it is only necessary that the first print processing is print processing executable by one of the first printer 10 and the second printer 30 and that the second print processing is print processing executable with the collaboration of the first printer 10 and the second printer 30.

In view of this, in the modified example 1, the first print processing is black-and-white print processing in which black-and-white printing is executable by any of the first printer 10 and the second printer 30, and the second print processing is color print processing in which color printing is to be executed by the two printers.

Moreover, in the tandem printing system 1 of the modified example 1, the first printer 10 (one printer) out of the first printer 10 and the second printer 30 is configured to perform the print processing by using the ink head unit 13a capable of ejecting the K color ink, and the second printer 30 (another printer) is configured to perform the print processing by using the ink head 33a capable of ejecting the C color ink, the M color ink, and the Y color ink. Note that ink colors ejected from the first printer 10 and the ink colors ejected from the second printer 30 may be interchanged.

In the modified example 1, the printing unit 13 including the ink head unit 13a capable of printing with the K color ink forms a first printing unit capable of printing with a K color printing agent. Meanwhile, the printing unit 33 including the ink head unit 33a capable of printing with the C color ink, the M color ink, and the Y color ink forms a second printing unit capable of printing with a C color printing agent, an M color printing agent, and a Y color printing agent.

In the modified example 1, the first printer 10 can print a black-and-white image by using the K color ink, and the second printer 30 can print a black-and-white image by color-mixing the C color ink, the M color ink, and the Y color ink. In other words, in the modified example 1, both of the first printer 10 and the second printer 30 can execute the black-and-white print processing. Note that, in the modified example 1, the predetermined print processing refers to the black-and-white print processing.

Moreover, in the modified example 1, the print processing based on the print job is assumed to be single-side printing processing in all cases. However, when each of the first printer 10 and the second printer 30 includes a turn-over conveyance route (not illustrated) in which the sheet P can be turned over, the print processing based on the print job may be the both-side printing processing.

Next, operations of the tandem printing system 1 of the modified example 1 are described. Note that, since the operations of the modified example 1 are different from the operations of the first embodiment only in the operations from steps S17 to S19, description is given while focusing on such different operations.

In step S17, the analyzer 43 determines whether the print processing based on the print job is the color print processing or the black-and-white print processing.

In step S18, when the analyzer 43 determines that the print processing is the color print processing ("COLOR PRINT PROCESSING" in step S17), the overall controller 44 waits until the cleaning processing is completed to perform the print processing.

In step S19, when the analyzer 43 determines that the print processing is the black-and-white print processing ("BLACK-AND-WHITE PRINT PROCESSING" in step S17), the overall controller 44 executes the black-and-white print processing based on the print job based on the print job by using a printer in which no cleaning processing is performed.

As described above, in the tandem printing system 1 of the modified example 1, even while the cleaning processing is being performed in only one of the two printers, but if the print processing based on the print job is the black-and-white print processing, the print processing based on the print job can be executed. Accordingly, it is possible to effectively utilize the time during the cleaning processing and improve the productivity of the tandem printing system 1.

MODIFIED EXAMPLE 2

Next, a modified example 2 of the tandem printing system 1 of the first embodiment is described.

In the aforementioned first embodiment, when the cleaning processing is being performed in one of the first printer 10 and the second printer 30, the single-side printing processing (first print processing) can be executed but the both-side printing processing (second print processing) cannot be executed. Accordingly, for example, when the cleaning processing is executed at different timings in the first printer and the second printer 30, a period in which the both-side printing processing cannot be executed becomes longer.

In view of this, an object of the tandem printing system 1 of the modified example 2 is to suppress execution of the cleaning processing at different timings and increase the time in which the second print processing can be executed.

In the tandem printing system 1 of the modified example 2, since operations in the normal state in which no cleaning processing is performed in the printers are different from those in the first embodiment, description is given while focusing on such points.

Specifically, in the modified example 2, in the normal state in which no cleaning processing is performed in the printers, the analyzer 43 analyzes whether the print processing based on the print job is the single-side printing processing (first print processing) or the both-side printing processing (second print processing).

Moreover, when the analyzer 43 determines that the print processing is the single-side printing processing, the overall controller 44 executes the single-side printing processing by using one of the printers such that the cleaning management printed sheet numbers of the respective printers which are counted by the counter 45 become equal.

Specifically, in the normal state, when the single-side printing processing is executed, the overall controller 44 refers to the storage 46 to compare the cleaning management printed sheet number associated with the identification information of the first printer 10 and the cleaning management printed sheet number associated with the identification information of the second printer 30, and specifies a printer with the smaller cleaning management printed sheet number. Then, the overall controller 44 executes the single-side printing processing by using the specified printer.

Next, in order to describe the configuration of the modified example 2 more specifically, the operations of the tandem printing system 1 in the modified example 2 are described with reference to FIG. 6. Since the operations of the modified example 2 are different from the operations of the first embodiment only in the operation of step S13, description is given while focusing on the operation of step S13.

Figure 6:
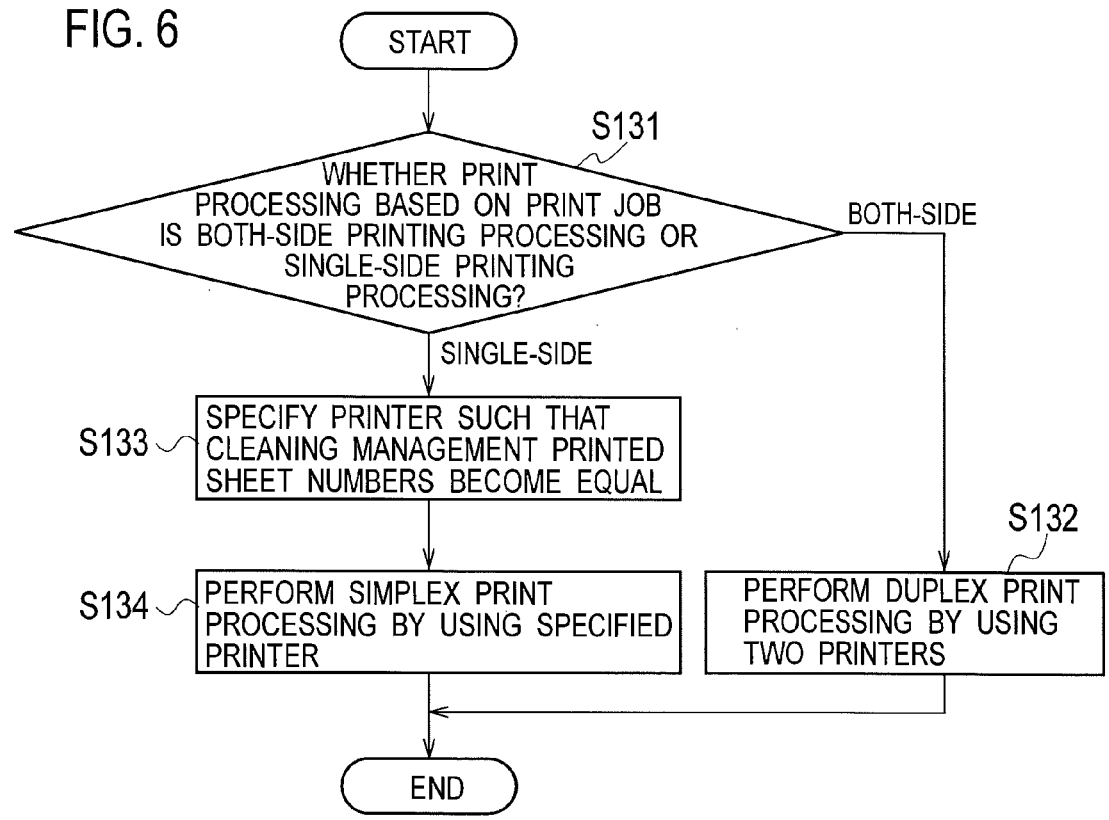
FIG. 6 is a flowchart depicting an operation of the tandem printing system in a modified example 2 of the first embodiment.

FIG. 6 is a flowchart specifically depicting the operation of step S13 of the tandem printing system 1 of the modified example 2.

First, in step S131, the analyzer 43 analyzes whether the print processing based on the print job is the single-side printing processing or the both-side printing processing.

In step S132, when the analyzer 43 analyzes that the print processing is the both-side printing processing ("BOTH-SIDE PRINTING PROCESSING" in step S131), the overall controller 44 executes the both-side printing processing by using both of the first printer 10 and the second printer 30.

Meanwhile, in step S133, when the analyzer 43 analyzes that the print processing is the single-side printing processing ("SINGLE-SIDE PRINTING PROCESSING" in step S131), the overall controller 44 refers to the storage 46 to compare the cleaning management printed sheet number (for example "800") of the first printer 10 and the cleaning management printed sheet number (for example "500") of the second printer and specify a printer (for example, the second printer 30) with the smaller cleaning management printed sheet number.

In step S134, the overall controller 44 executes the single-side printing processing by using the specified printer (for example, the second printer 30). The cleaning management printed sheet number (for example "500") of the specified printer (for example, the second printer 30) is thereby incremented to equalize the cleaning management printed sheet number of the first printer 10 and the cleaning management printed sheet number of the second printer 30.

As described above, in the tandem printing system 1 of the modified example 2, when the single-side printing processing is executed in the normal mode, the overall controller 44 executes the single-side printing processing such that the cleaning management printed sheet numbers of the first printer 10 and the second printer 30 become equal to each other. Specifically, the overall controller 44 executes the single-side printing processing by using a printer with the smaller cleaning management printed sheet number.

Hence, the overall controller 44 can execute the single-side printing processing by using a printer whose cleaning management printed sheet number reaches the predetermined sheet number at a timing later than the other printer, i.e. in which the cleaning execution condition is satisfied at a timing later than the other printer. Accordingly, the difference between the cleaning management printed sheet numbers respectively of the first printer 10 and the second printer 30 can be reduced.

Furthermore, when the cleaning management printed sheet number of one of the first printer 10 and the second printer reaches the predetermined sheet number, the overall controller 44 causes both of the first printer 10 and the second printer 30 to execute the cleaning simultaneously even if the cleaning management printed sheet number of the other printer has not reached the predetermined sheet number, provided that the difference between the cleaning management printed sheet numbers of both printers is within a predetermined range of sheet number difference.

As described above, in the tandem printing system 1 of the modified example 2, the timings at which the cleaning processing is executed are synchronized, and this can increase the period in which the both-side printing processing being the second print processing can be executed.

Although the first print processing is described as the single-side printing processing and the second print processing is described as the both-side printing processing in the modified example 2, the first print processing may be the black-and-white print processing and the second print processing may be the color print processing as in the aforementioned modified example 1. Moreover, in this case, the configuration may be such that the first printer 10 performs the print processing by using the inkjet head capable of ejecting the K color ink, and the second printer 30 performs the print processing by using the inkjet heads capable of ejecting the C color ink, the M color ink, and the Y color ink.

Other Embodiments

The present invention is not limited to the aforementioned embodiment.

For example, in the aforementioned embodiment, as illustrated in FIG. 1, the tandem printing system 1 is described to have, as an example, the configuration in which the printing units 13, 33 are arranged in the printers 10, 30. However, the configuration of the tandem printing system 1 is not limited to this. For example, the configuration may be such that the printers 10, 30 are physically separated into two or more parts, and the printing units 13, 33 may also be separated accordingly.

Moreover, in the aforementioned embodiment, the overall control device 40 is provided outside the first printer 10, the intermediate device 20, and the second printer 30. However, the overall control device 40 may be provided inside any of the first printer 10, the intermediate device 20, and the second printer 30.

Moreover, although the overall control device 40 is configured to receive the print job from the terminal device 100 in the aforementioned embodiment, the configuration of the overall control device 40 is not limited to this in the present invention. For example, the overall control device 40 may receive a print job including an image inputted by an operation performed on an operation panel (not illustrated) or the like. Such print jobs include, for example, a print job obtained by optically reading an image of an original laid on a contact glass (not illustrated).

Moreover, although the printing units 13, 33 are configured to print images on the sheet P by using the inkjet heads by means of the inkjet method in the aforementioned embodiment, the configurations of the printing units 13, 33 are not limited to this. For example, the printing units 13, 33 may be configured to print images on the sheet P by using photosensitive drums by means of an electrophotographic method (so-called toner method) in which toners attached to surfaces of the photosensitive drums are transferred onto the sheet P.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. A printing system comprising:
  a conveyance route configured to convey a sheet;
  a first printer configured to execute printing on the sheet;
  a second printer configured to execute printing on the sheet;
  a first cleaner configured to execute cleaning in the first printer upon satisfaction of a first cleaning execution condition;
  a second cleaner configured to execute cleaning in the second printer upon satisfaction of a second cleaning execution condition; and
  a controller configured to control the first printer and the second printer, wherein
  the first printer and the second printer are arranged in series along the conveyance route, and
  the controller is configured to:
    receive a print job;
    upon receiving the print job, determine whether cleaning is being performed on only one of the first printer and the second printer;
    upon determining that the only one of the first printer and the second printer is under cleaning, analyze whether a print processing based on the print job is a first print processing in which printing is executable by any of the first printer and the second printer or a second print processing in which printing is to be executed by both the first printer and the second printer; and
    upon analyzing that the print processing based on the print job is the first print processing, drive the other one of the first printer and the second printer which is not under cleaning to execute the first print processing.

2. The printing system according to claim 1, wherein
  the first print processing is a single-side printing processing in which printing is executed on one side of the sheet, and
  the second print processing is a both-side printing processing in which printing is executed on both sides of the sheet.

3. The printing system according to claim 2, wherein the controller is configured to:
  count a first printed sheet number and a second printed sheet number, the first printed sheet number being a number of sheets printed in the first printer from completion of the cleaning to start of the next cleaning in the first printer, the second printed sheet number being a number of sheets printed in the second printer from completion of the cleaning to start of the next cleaning in the second printer;

upon none of the first printer and the second printer being under cleaning, analyze whether the print processing based on the print job is the first print processing or the second print processing; and upon analyzing that the print processing based on the print job is the first print processing, select one of the first printer and the second printer and drive the selected printer to execute the first print processing such that the first printed sheet number and the second printed sheet number become equal or close to each other.

4. The printing system according to claim 1, wherein the first printer is configured to execute a print processing by using a first printing unit capable of printing with a K color printing agent, the second printer is configured to execute a print processing by using a second printing unit capable of printing with a C color printing agent, an M color printing agent, and a Y color printing agent, the first print processing is a black-and-white print processing in which black-and-white printing is executable, and the second print processing is a color print processing in which color printing is to be executed.

5. The printing system according to claim 4, wherein the controller is configured to:

count a first printed sheet number and a second printed sheet number, the first printed sheet number being a number of sheets printed in the first printer from completion of the cleaning to start of the next cleaning in the first printer, the second printed sheet number being a number of sheets printed in the second printer from completion of the cleaning to start of the next cleaning in the second printer;

upon none of the first printer and the second printer being under cleaning, analyze whether the print processing based on the print job is the first print processing or the second print processing; and upon analyzing that the print processing based on the print job is the first print processing, select one of the first printer and the second printer and drive the selected printer to execute the first print processing such that the first printed sheet number and the second printed sheet number become equal or close to each other.

6. The printing system according to claim 1, wherein the controller is configured to:

count a first printed sheet number and a second printed sheet number, the first printed sheet number being a number of sheets printed in the first printer from completion of the cleaning to start of the next cleaning in the first printer, the second printed sheet number being a number of sheets printed in the second printer from completion of the cleaning to start of the next cleaning in the second printer;

upon none of the first printer and the second printer being under cleaning, analyze whether the print processing based on the print job is the first print processing or the second print processing; and upon analyzing that the print processing based on the print job is the first print processing, select one of the first printer and the second printer and drive the selected printer to execute the first print processing such that the first printed sheet number and the second printed sheet number become equal or close to each other.

7. The printing system according to claim 1, further comprising:

an intermediate device arranged along the conveyance path between the first printer and the second printer, wherein the intermediate device is configured to convey the sheet along one of a straight route or a turn-over route for turning over the sheet, and the intermediate device is arranged downstream of the first printer and upstream of the second printer such that the second printer is spaced from the first printer along the conveyance route.

\* \* \* \* \*